Nov. 2, 1926.

C. BIENZ

VALVE CONTROLLING DEVICE

Filed Feb. 10, 1925

Inventor
Charles Bienz
By
Attorneys

Patented Nov. 2, 1926.

1,605,501

UNITED STATES PATENT OFFICE.

CHARLES BIENZ, OF GENEVA, SWITZERLAND.

VALVE-CONTROLLING DEVICE.

Application filed February 10, 1925, Serial No. 8,240, and in Germany February 28, 1924.

This invention relates to an improved valve controlling device.

The object of the invention is to provide a device for controlling valves by means of an integral two armed tumbler adapted to act on the periphery of a single cam arranged so as to impart an alternating oscillating motion to the tumbler.

Figure 1:
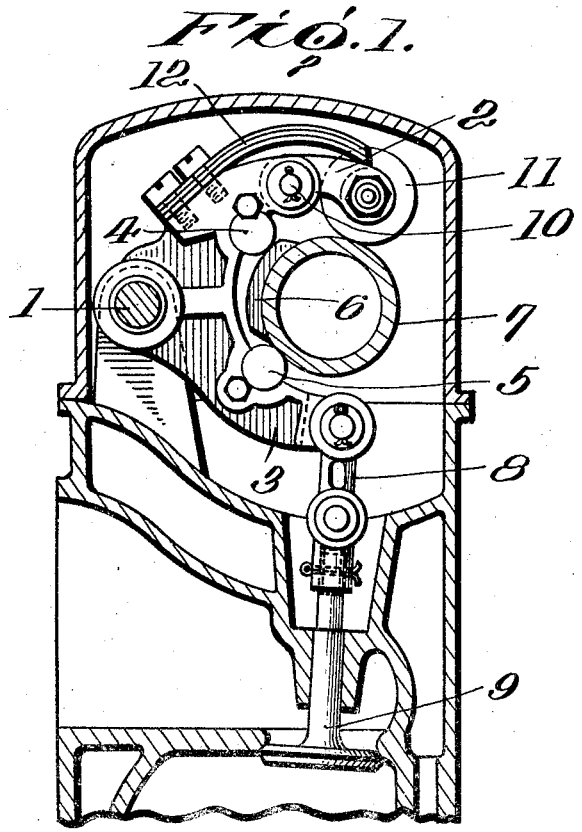
Figure 1 is an elevation view of one form of construction.

The valve controlling tumbler according to the first form of construction oscillates about a shaft 1 and comprises two arms 2 and 3 acting by means of rollers 4 and 5 on the periphery of a cam 6 mounted on a cam shaft 7.

The end of the arm 3 is connected by means of a connection 8 to the rod of a valve 9 of an engine or the like.

Figure 2:
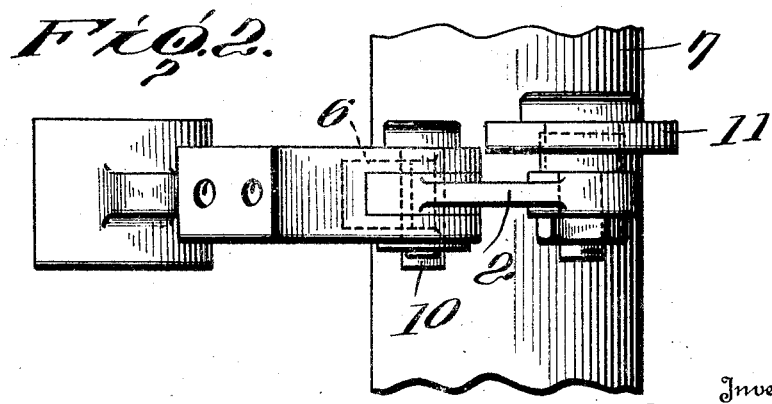
Figure 2 is a plan view of the upper arm.

The arm 2 is hinged at 10 and carries at its end a roller 11 which is forced to bear on the periphery of the cam shaft 7 by a spring 12 mounted on the fixed part of the arm 2. In Figure 2 the spring 12 is assumed to be removed.

When this tumbler is in operation the cam shaft 7, in revolving, lifts each of the arms 2 and 3 alternately by means of its cam 6, acting in turn on the rollers 4 and 5. The roller 11 owing to the action of the spring 12 is pressed on the periphery of the cam shaft 7 and causes the roller 5 of the arm 3 to remain constantly in contact with the periphery of the cam 6.

When the roller 5 reaches that part of the periphery of the cam 6 having the smallest diameter the valve 9 is closed on its seat where it is pressed by the action of the spring 12. Then that part of the periphery of the cam 6 of largest diameter will act on the roller 5 and cause the tumbler to turn about the shaft 1 the effect of which is to open the valve 9. Finally this same part of the cam 6 will act on the roller 4 which will have the effect of causing the tumbler to turn in the opposite direction about the shaft 1 and to return the valve 9 to its original position.

That part of the periphery of the cam 6 which has the largest diameter is of such a length that the roller 4 commences to travel up one of the inclined faces which connects it with the part of smaller diameter the moment the roller 5 commences to descend a second inclined face. This arrangement enables the valve 9 to be progressively closed so that the shutting off shall not be violent.

I declare that what I claim is:

1. A valve controlling device comprising a rotary shaft, a single cam mounted on said shaft having cam faces at varying radial distances from said shaft, a tumbler having two integral arms contacting simultaneously with said different cam faces, an extension pivoted on the end of one of said arms, a spring pressing said pivoted extension continuously against said cam and means connecting said other arm to said valve.

2. A valve controlling device comprising a rotary shaft, a single cam mounted on said shaft having cam faces at varying radial distances from said shaft, a pivoted tumbler having two integral arms, a roller mounted on each of said arms said rollers lying in one plane and contacting simultaneously with said different cam faces, an extension pivoting on the end of one of said arms, a spring pressing said pivoted extension continuously against said cam and means connecting said other arm to said valve.

In witness whereof, I have hereunto signed my name this 26th day of January 1925.

CHARLES BIENZ.